(12) United States Patent
Lund

(10) Patent No.: US 6,367,860 B1
(45) Date of Patent: *Apr. 9, 2002

(54) WINDSHIELD VISOR FOR MOTOR VEHICLES

(75) Inventor: David Lund, Andover, MN (US)

(73) Assignee: Lund Industries, Incorporated, Anoka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,590

(22) Filed: Aug. 7, 2000

Related U.S. Application Data

(63) Continuation of application No. 09/216,276, filed on Dec. 18, 1998, now Pat. No. 6,099,065, which is a continuation of application No. 08/729,364, filed on Oct. 16, 1996, now Pat. No. 5,851,044, which is a continuation of application No. 08/729,364.

(60) Provisional application No. 60/006,021, filed on Oct. 23, 1995.

(51) Int. Cl.[7] ................................................. B60J 3/00
(52) U.S. Cl. ...................... 296/95.1; 296/152; 296/154
(58) Field of Search .......................... 296/95.1, 91, 152, 296/146.9, 84.1, 154; D12/181, 182

(56) References Cited

U.S. PATENT DOCUMENTS

| D85,241 S | 9/1931 | Henderson |
|---|---|---|
| 2,073,159 A | 3/1937 | Lintern et al. |
| 2,236,846 A | 4/1941 | Davisson |
| 2,475,901 A | 7/1949 | Kipp |
| D154,735 S | 8/1949 | Arbid |
| D154,861 S | 8/1949 | Manher |
| D156,479 S | 12/1949 | Bingman |
| D157,555 S | 3/1950 | Abrams |
| D159,144 S | 6/1950 | Dieterich |
| 2,534,763 A | 12/1950 | Flavin |
| 2,566,934 A | 9/1951 | Dieterich |
| 2,567,501 A | 9/1951 | Zeis |
| 2,599,809 A | 6/1952 | Branch |
| D167,676 S | 9/1952 | Chicorel |
| 2,757,954 A | 8/1956 | Hurley |
| 2,777,732 A | 1/1957 | Walsh |
| 2,792,254 A | 5/1957 | Hagglund |
| 2,793,705 A | 5/1957 | Garrity |
| 3,015,517 A | 2/1962 | Thornburgh |
| 3,022,848 A | 2/1962 | Heiser |

(List continued on next page.)

FOREIGN PATENT DOCUMENTS

| FR | 1096819 | 6/1955 |
|---|---|---|
| FR | 1121035 | 7/1956 |
| GB | 734743 | 8/1955 |
| GB | 829154 | 2/1960 |

OTHER PUBLICATIONS

Hot Rod, p. 96, dated Aug. 1975.
Volvo GM Heavy Truck Corporation publication, 8 pages, copyright 1987.

*Primary Examiner*—Stephen T. Gordon
*Assistant Examiner*—Jason Morrow
(74) *Attorney, Agent, or Firm*—Merchant & Gould P.C.

(57) ABSTRACT

Windshield visor for motor vehicles having windshield, roof, and driver and passenger side door frames. The windshield visor includes a forward wing, a first mounting plate, and a second mounting plate. The forward wing provides shading from sun light and shielding from precipitation, and has left and right wing tips, top and bottom surfaces, and leading and trailing edges. The first mounting plate is connected to the left wing tip of forward wing and attaches to a motor vehicle's driver side door frame. The second mounting plate is connected to the right wing tip of the forward wing and attached to the motor vehicle's passenger side door frame.

2 Claims, 6 Drawing Sheets

U.S. PATENT DOCUMENTS

| | | | |
|---|---|---|---|
| D201,496 S | 6/1965 | Stef | |
| 3,214,216 A | 10/1965 | Brown | |
| 3,678,635 A | 7/1972 | Vagi et al. | |
| 3,695,674 A | 10/1972 | Baker | |
| 3,728,537 A | 4/1973 | Barenyi et al. | |
| 3,785,699 A | 1/1974 | Molaskey et al. | |
| 3,815,700 A | 6/1974 | Mittendorf | |
| D239,705 S | 4/1976 | Lund | |
| 4,018,472 A | 4/1977 | Mason | |
| 4,040,656 A | 8/1977 | Clenet | |
| 4,043,587 A | 8/1977 | Giallourakis et al. | |
| 4,052,099 A | 10/1977 | Lowrey et al. | |
| 4,063,773 A | 12/1977 | Modesette | |
| 4,149,749 A | 4/1979 | Canal | |
| 4,153,129 A | 5/1979 | Redmond | |
| 4,159,845 A | 7/1979 | Bratsberg | |
| D252,680 S | 8/1979 | Kingsley | |
| 4,219,870 A | 8/1980 | Haraden et al. | |
| 4,262,954 A | 4/1981 | Thompson | |
| D261,500 S | 10/1981 | Butler | |
| 4,320,919 A | 3/1982 | Butler | |
| 4,412,698 A | 11/1983 | Kingsley | |
| D272,429 S | 1/1984 | Trombley et al. | |
| D273,672 S | 5/1984 | Lund | |
| 4,471,991 A | 9/1984 | Matthias | |
| D283,120 S | 3/1986 | Trombley et al. | |
| D283,611 S | 4/1986 | Kingsley | |
| D284,565 S | 7/1986 | Trombley et al. | |
| 4,627,657 A | 12/1986 | Deniels et al. | |
| D288,309 S | 2/1987 | Lund | |
| D288,310 S | 2/1987 | Lund | |
| D291,295 S | 8/1987 | Lund | |
| 4,707,014 A | 11/1987 | Rich | |
| 4,726,619 A | 2/1988 | Haugestad et al. | |
| 4,758,040 A | 7/1988 | Kingsley | |
| 4,776,627 A | 10/1988 | Hutto et al. | |
| D299,713 S | 2/1989 | Dunham | |
| 4,819,136 A | 4/1989 | Ramsey | |
| D300,918 S | 5/1989 | Turner | |
| D301,028 S | 5/1989 | Buck | |
| D301,450 S | 6/1989 | Kingsley | |
| 4,842,320 A | 6/1989 | Kingsley | |
| D304,819 S | 11/1989 | Chapman et al. | |
| 4,929,013 A | 5/1990 | Eke | |
| 4,966,404 A | 10/1990 | Lund | |
| D312,238 S | 11/1990 | Lund | |
| D319,209 S | 8/1991 | Miller | |
| 5,108,142 A | 4/1992 | Lund | |
| 5,112,095 A | 5/1992 | Lund et al. | |
| 5,130,906 A | 7/1992 | Lund | |
| 5,184,866 A | 2/1993 | Dresen et al. | |
| 5,238,268 A * | 8/1993 | Logan | 280/848 |
| D360,176 S | 7/1995 | Onopa | |
| 5,452,933 A | 9/1995 | Stanesic et al. | |
| 5,522,634 A | 6/1996 | Stanesic et al. | |
| 5,636,892 A | 6/1997 | Gordon | |
| 5,664,871 A | 9/1997 | Thompson | |

\* cited by examiner

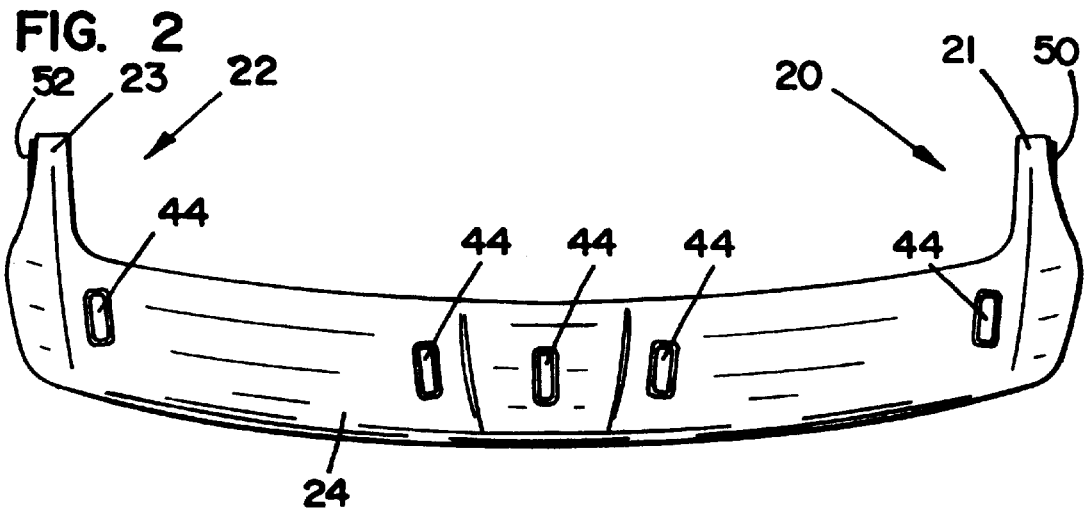
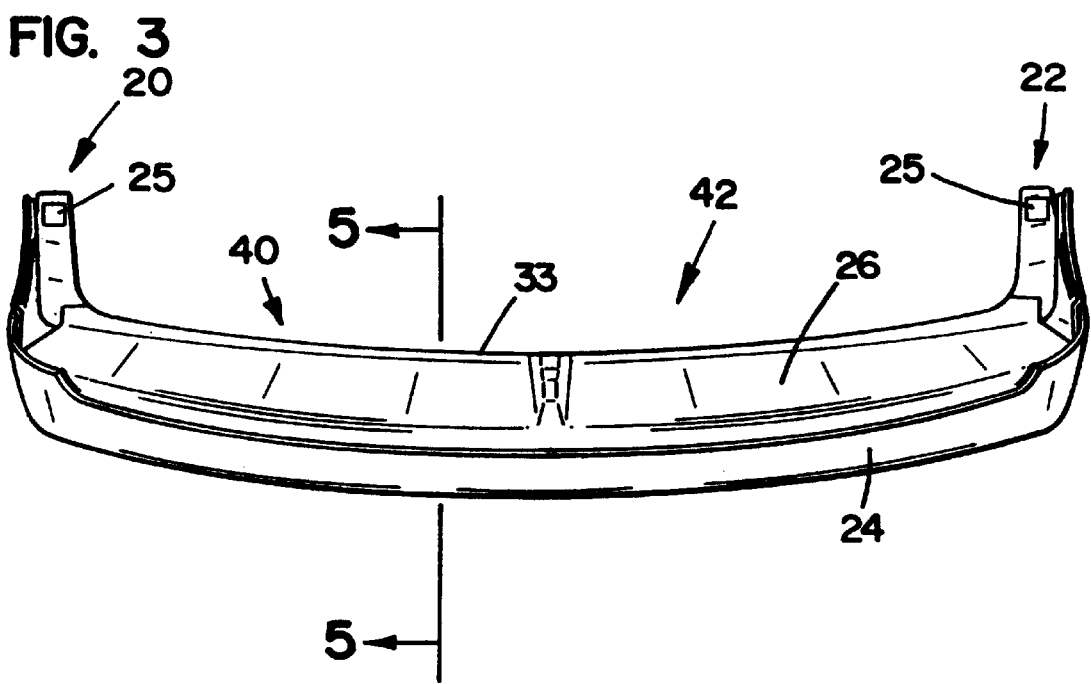

WINDSHIELD VISOR FOR MOTOR VEHICLES

This application is a continuation of application Ser. No. 09/216,276, filed Dec. 18, 1998, which issued as U.S. Pat. No. 6,099,065 on Aug. 8, 2000, which is a continuation of application Ser. No. 08/729,364, filed Oct. 16, 1996, which issued as U.S. Pat. No. 5,851,044 on Dec. 12, 1998. U.S. application Ser. No. 08/729,364, which was filed Oct. 16, 1996 claims priority to provisional application Ser. No. 60/006,021, which was filed Oct. 23, 1995. Application Ser. Nos. 09/216,276, 08/729,364 and 60/006,021 are incorporated herein by reference.

FIELD OF THE INVENTION

The present invention relates to a windshield visor for motor vehicles, a motor vehicle having a windshield visor, a method for manufacturing a windshield visor, and a method for attaching a windshield visor to a motor vehicle.

BACKGROUND OF THE INVENTION

Windshield visors have been attached to trucks and other motor vehicles to provide protection against sun and rain and to provide increased visibility. They generally extend beyond the forward edge of the roof and over the front windshield of the motor vehicle.

A concern with windshield visors is that sufficient structural mounting and air relief are provided. The forward movement of the vehicle causes air flowing upward and across the front windshield to provide a force against the bottom surface of the visor. During high speed travel, the force of the air has been found to rip poorly designed visors from the motor vehicle. Even if the visor is securely attached, the differences in air pressure across the lower surface can cause "flutter." This is exhibited by a bending and/or twisting motion. Flutter can also result if the visor is not sufficiently rigid and strong. The occurrence of flutter is not only distracting to the vehicle occupants, but it can also fatigue the visor at those locations where it is mounted to the vehicle and eventually cause it to rip off the vehicle's roof. Therefore, windshield visors should be designed so they can securely attach to the vehicle, and provide sufficient air relief and rigidity.

Roof mounted windshield visors are fairly common and are described, for example, in U.S. Pat. Nos. Des. 288,309 to Lund; Des. U.S. Pat. No. 312,238 to Lund; U.S. Pat. No. 4,966,404 to Lund; Des. U.S. Pat. No. 301,450 to Kingsly; Des. U.S. Pat. No. 301,028 to Buck;. U.S. Pat. No. 291,295 to Lund; Des. U.S. Pat. No. 288,310 to Lund; U.S. Pat. No. 4,726,619 to Haugestad; and U.S. Pat. No. 4,842,320 to Kingsley. The windshield visors described by these patents can be characterized as roof mounted visors since they require fastening to the motor vehicle's roof at several locations. Most commonly, the fastening points are in the roof immediately above the front windshield. The visor then extends from the forward edge of the roof and outward, over the windshield.

Other windshield visors which may not be technically considered "roof mounted" are described by U.S. Pat. No. 4,758,040 to Kingsley et al. and Des. U.S. Pat. No. 252,680 to Kingsley et al. These visors are mounted at the juncture of the roof and the edge of the windshield. Similar to the roof mounted windshield visors, however, they require fastening at several points by putting holes at locations which are highly visible if the visor is ever removed.

Many of the above-described visors provide sufficient structural support. Their points of attachment, however, are in the roof of the vehicle or at the juncture of the roof and the edge of the windshield. Owners of new trucks or utility vehicles are often reluctant to put holes in their new vehicle at those highly visible locations. If they ever decide to remove the windshield visor, expensive repair work would be necessary to remove the scars and return the vehicle to its original appearance. Furthermore, the repairs may never completely hide the fact that holes were drilled or punched in the roof. Similarly, people who lease motor vehicles are often reluctant to purchase a windshield visor since the visor may have to remain with the motor vehicle after the lease expires.

A new style of light truck and utility vehicle has been developed which is more aerodynamic than older trucks. This new style is characterized by a more rounded and sleeker look, and the replacement of exterior drip rails or rain gutters with "aircraft style doors" which provide internal rain gutters. For many consumers, the presently available windshield visors do not provide a satisfactory look on these newly designed vehicles. A part of the problem appears to be that several roof mounted visors do not adequately fit the curved contour of the roof. In addition, a sleeker or softer looking visor is desired for these vehicles.

SUMMARY OF THE INVENTION

A windshield visor for use on motor vehicles having windshield, roof, and driver and passenger side door frames, is provided by the present invention. A windshield visor is a device which is attachable to a motor vehicle to provide shading of the windshield from sun light and/or shielding of the windshield from precipitation. By providing shading and/or shielding, the vehicle driver's visibility can be enhanced thereby increasing the overall safety of the motor vehicle. Accordingly, the windshield visor of present invention can be considered a safety device for motor vehicles.

The windshield visor of the present invention includes a forward wing for providing shading from sun light and shielding from precipitation, a first mounting plate, and a second mounting plate. The forward wing includes left and right wing tips, top and bottom surfaces, and leading and trailing edges. The first mounting plate is connected to the left wing tip of the forward wing and is constructed and arranged to attach to a motor vehicle's driver side door frame. The second mounting plate is connected to the right wing tip of said forward wing and is constructed and arranged to fit a motor vehicle's passenger side door frame. It should be appreciated that in the context of the present invention, the terms "left" and "right" describe the left and right sides, respectively, from the position of the driver of the motor vehicle. In most situations, it should be understood that the left side refers to the driver's side of the motor vehicle, and the right side refers to the passenger's side of the motor vehicle.

The windshield visor preferably includes a tensional inducer which allows the forward wing to rest on a vehicle's roof/windshield and which provides enhanced rigidity of the visor when the first and second mounting plates are fastened to a motor vehicle's driver and passenger side door frames. The forward wing preferably includes a top panel and a bottom panel secured together by adhesive. The trailing edge of the forward wing is constructed and arranged to provide an air relief vent which allows the air to pass over the vehicle' windshield and through the vent. When the tensional inducer is provided, two air relief vents are preferably provided.

A motor vehicle is provided by the present invention. The motor vehicle includes: a windshield; driver and passenger side door frames; and a visor which includes a forward wing for shading the windshield from sun light and shielding the windshield from precipitation, a first mounting plate connected to the left wing tip of the forward wing and the driver side door frame, and a second mounting plate connected to the right wing tip of the forward wing and the passenger side door frame.

The windshield visor can be attached to the motor vehicle by placing the mounting plates of the visor along the driver and passenger door frames of a motor vehicle; and fastening the visor to the door frame of the motor vehicle.

A method for manufacturing a windshield visor is provided by the present invention. The method includes the steps of providing a top panel and a bottom panel, the top and bottom panels being constructed and arranged to provide a forward wing having left and right wing tips and a closed structure; providing a first mounting plate constructed and arranged to attach to the left wing tip of the forward wing; providing a second mounting plate constructed and arranged to attach to the right wing tip of the forward wing; and assembling the top and bottom panels and the first and second mounting plates so that the first mounting plate is secured to the left wing tip and the second mounting plate is secured to the right wing tip. The step of providing a top panel and a bottom panel preferably includes vacuum molding sheets of polymer containing material. The steps of providing first and second mounting plates preferably includes stamping metal sheets in a die.

BRIEF DESCRIPTION OF THE DRAWINGS

FIG. 2 is a top plan view of the windshield visor of FIG. 1;

FIG. 3 is a bottom plan view of the windshield visor of FIG. 1;

DETAILED DESCRIPTION OF THE INVENTION

Figure 1:
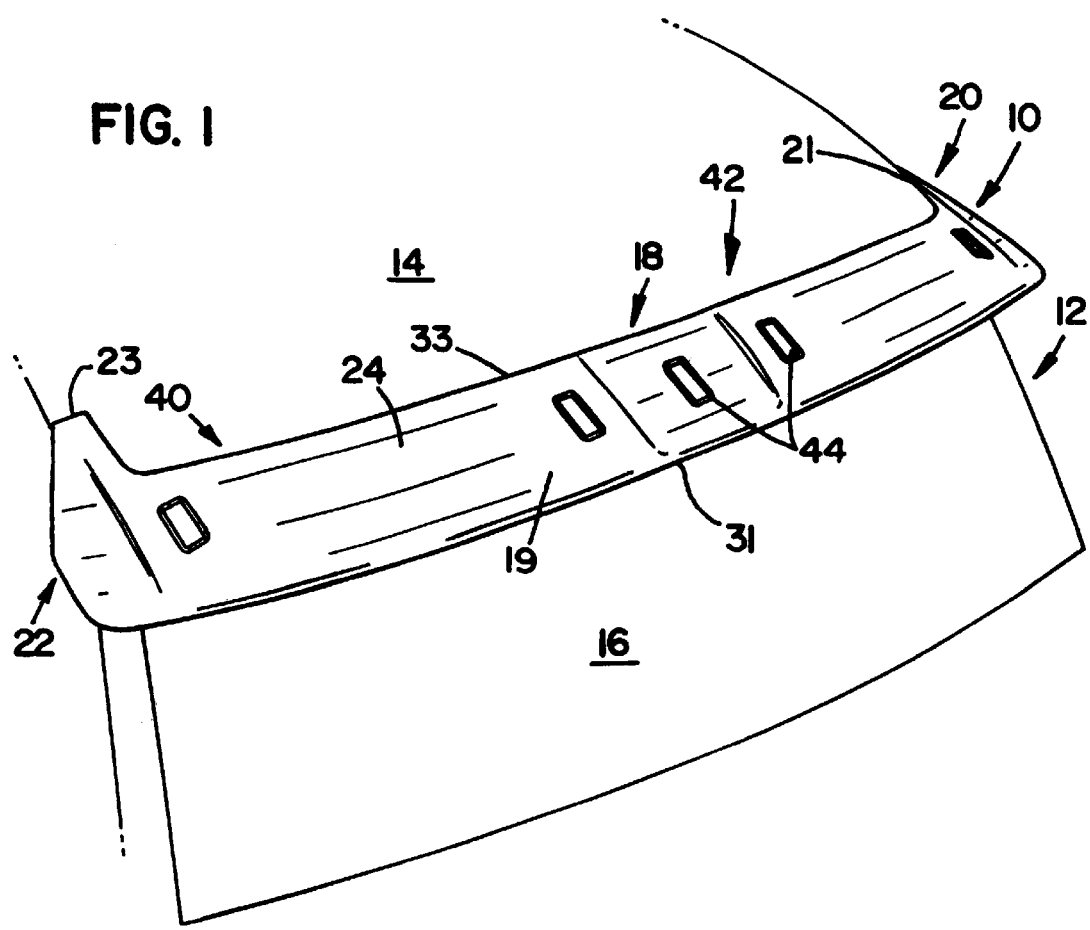
FIG. 1 is a perspective view of a windshield visor according to the principles of the present invention mounted on a truck.
Figure 7:
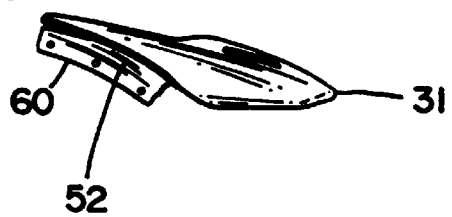
FIG. 7 is an elevated side view of the windshield visor of FIG. 1.

The preferred embodiments of the invention are now described in detail with reference to the drawings, wherein like reference numerals represent like parts and assemblies throughout the several views. Reference to the preferred embodiments does not limit the scope of the invention which is limited only by the scope of the claims attached hereto.

Referring to FIGS. 1–7, a windshield visor in accordance with the present invention is depicted at reference numeral 10 and is mounted to a truck 12 extending generally away from the truck roof 14 and over the windshield 16. According to the present invention, a windshield visor is a device which is attachable to a motor vehicle to provide shading of the windshield from sun light and/or shielding of the windshield from precipitation. The windshield visor of the present invention may hereinafter be referred to as the visor.

As those skilled in the art will appreciate, the dimensions of vehicle windshields, roof lines, door frames and the like varies widely from manufacturer to manufacturer. For the most part, the configurations employed by each manufacturer for each motor vehicle model are unique. Accordingly, it should be understood that the following described windshield visor may be unique to a particular motor vehicle, but the teachings herein can be applied to windshield visors for other models.

The windshield visor according to the present invention is preferably mounted to light trucks, such as a pickup trucks, or utility vehicles. It should be appreciated, however, that the windshield visor can be used on other motor vehicles such as cars, boats, heavy trucks, and the like. It is understood that one having skill in the art would readily appreciate that the present invention can be adapted for motorized and non-motorized vehicles. Furthermore, motor vehicles not having exterior rain rails or gutters are particularly suited for use with the windshield visor of the present invention. It is a common feature in many of the presently marketed models of trucks and utility vehicles that the rain gutters are provided within the door frame. This style of rain gutter can be referred to as "aerodynamic rain gutters" or "interior rain gutters." By removing the exterior rain gutters, the motor vehicles have, in general, taken on a more rounded or softer look, and have gotten away from the hard edge or sharp angular look. In addition, the roofs of the motor vehicles tend to be more curved. As a result, many of the presently marketed windshield visors are too angular and clash with these softer looking motor vehicles. In addition, it can be difficult to properly fit roof mounted visors to the curved roofs of these newer motor vehicles.

It is a discovery of the present invention that the existence of interior rain gutters provides motor vehicles having excellent locations inside the door frame for attaching windshield visors thereto. The attachment of the windshield visors is discussed in more detail below. However, it should be appreciated that the windshield visors of the present invention can be used on motor vehicles which do not have interior rain gutters. As will be understood from the following description, the visors of the present invention can be adapted for use on the older, more angular motor vehicles.

The windshield visor 10 includes shading and shielding region 18 and mounting regions 20, 22. When mounted on the truck 12, the shading and shielding region 18 extends forward and above the plane of the front windshield 16 thereby providing shading of the windshield 16 from sun light and shielding from precipitation. As can be seen in FIG. 1, the shading and shielding region 18 extends away from the front edge of the roof and out over the vehicle's hood. The mounting regions 20, 22 provide for attachment of the windshield visor 10 to the truck 12. The details of each of these regions is described in more detail below.

As used in the context of the present invention, the shading and shielding region 18 includes a forward wing 19, and wing tips 21, 23. It should be understood that the "wing tips" generally refer to the left and right ends of the shading and shielding region 18 and as shown in the figures, may include portions thereof which extend rearwardly. The underneath side of the wing tips 21, 23 preferably include double sided automobile adhesive tape 25 for adhering the wing tips to the roof of the vehicle, as shown in FIG. 3.

Figure 4:
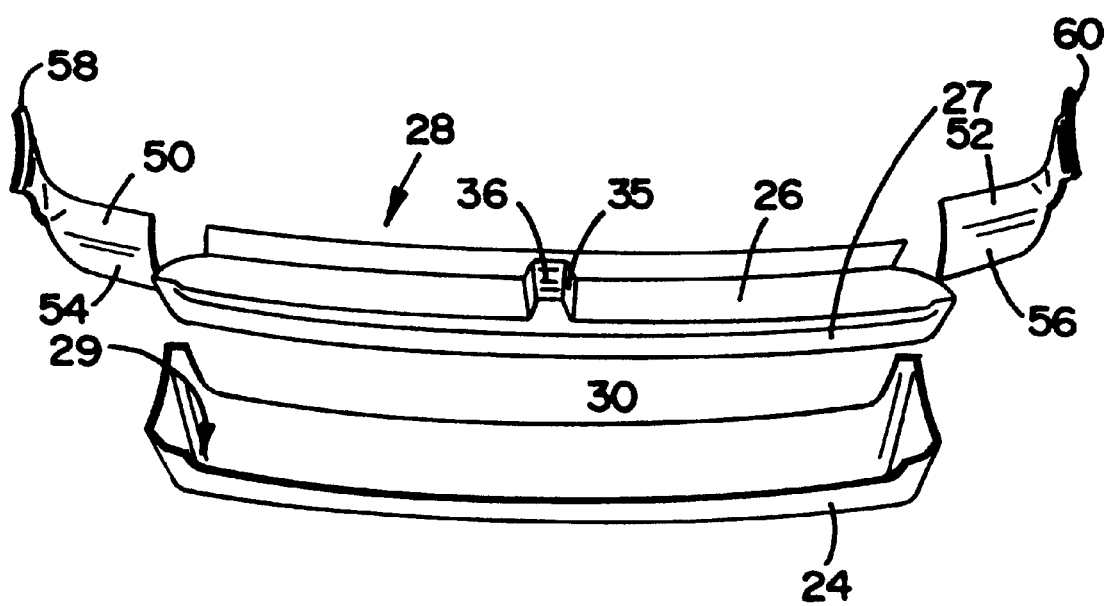
FIG. 4 is an exploded view of the windshield visor of FIG. 3.
Figure 5:
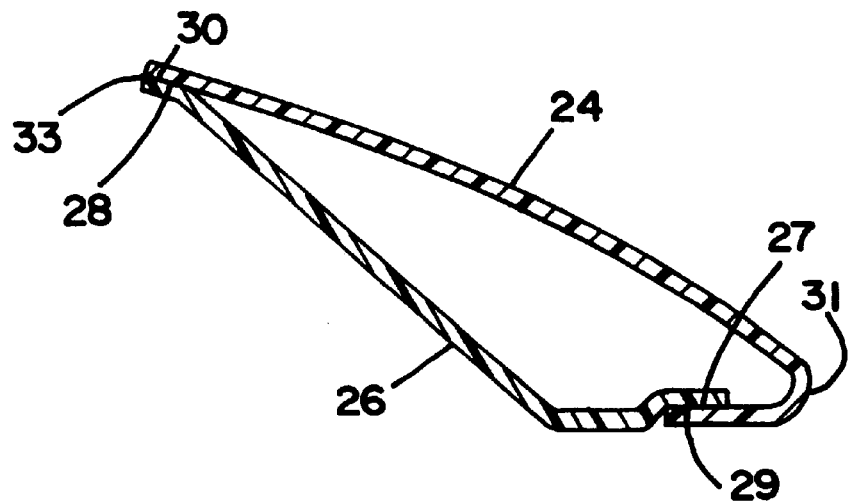
FIG. 5 is a vertical, partial sectional view of the windshield visor of FIG. 3 taken along line 5—5.
Figure 6:
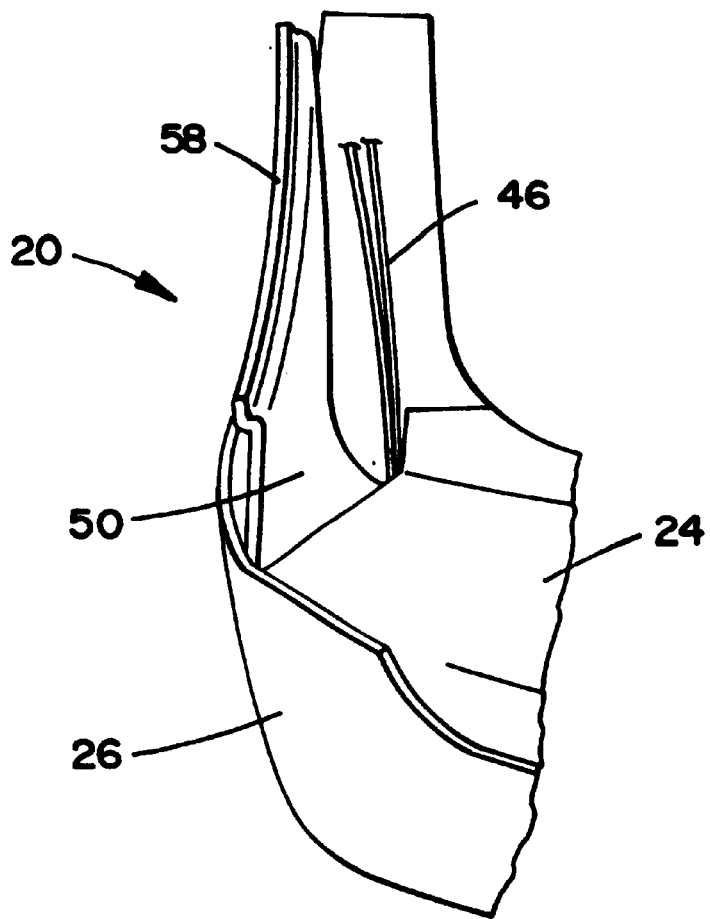
FIG. 6 is an isolated view of a mounting region of the windshield visor of FIG. 1.

The shading and shielding region 18 is preferably constructed of a top panel 24 and a bottom panel 26. The top panel 24 is provided with a shell configuration for receiving the bottom panel 26 therein. Referring now specifically to FIGS. 4 and 5, the first and second engaging surfaces 27, 28, respectively, of the bottom panel 26 are provided for insertion into the first and second receiving surfaces 29, 30, respectively, of the top panel 24. The structure can be held together by any fastener commonly used in the art, such as, adhesive, bolts, welding, clamps, screws, and the like. Preferably, the fastener is an adhesive which provides sufficient structural adhesion between the materials.

The forward wing 19 formed by the top and bottom panels 24, 26 can be referred to as a closed structure having a leading edge 31 and a trailing edge 33. Generally, this means that a tube-like structure is provided which resists leakage of moisture, such as rain, therein. In addition, by fastening the two panels together, the rigidity and strength of the structure can be increased. In a preferred embodiment, the top and bottom panels 24, 26 are molded from a polymer containing material, such as 3/16 inch ABS resin (a polymer composition based on acrylonitrile-butadiene-styrene polymer), by vacuum molding to form the desired shapes. Although each of the panels is separately fairly flexible, a monocoque structure can be provided by combining and fastening the panels together. Thus, a relatively rigid and strong structure can be provided without the need for internal supporting structure.

It should be appreciated that various other materials can be selected for use in the present invention as would be apparent to one having ordinary skill in the art. For example, the top and/or bottom panels can be prepared by stamping sheet metal in an appropriate die, or can be formed from fiberglass, or from other known engineering plastics by, for example, vacuum molding, injection molding, and the like.

To provide additional rigidity to the entire windshield visor 10 when placed on a motor vehicle, the tensional inducer 35 is provided. This tensional inducer 35 engages the motor vehicle and, when the visor 10 is tightened into place, thereby provides a tension or stress across the visor 10. In a preferred embodiment, a closed cell foam pad 36 is provided on the surface of the tensional inducer 35, and contacts the truck 12 at the roof/windshield interface. Explained in another way, the tensional inducer 35 acts as a fulcrum about which the visor 10 is tightened. It should be appreciated that the tensional inducer 35 is an optional feature since the invention can be successfully practiced without it. This is particularly the case when the visor is made from materials possessing sufficient rigidity and strength without the tensional inducer. Thus, the tensional inducer provides a mechanism by which less expensive materials can be used without sacrificing rigidity and strength. Preferably, the foam pad 36 is double sided foam adhesive tape which adheres to both the tensional inducer 35 and the roof/windshield interface. The double sided foam adhesive tape can be used to reduce vibration of the visor against the roof/windshield interface.

Sufficient air relief is provided by the visor 10 by providing air relief vents 40, 42. These vents allow sufficient amounts of air to escape from under the visor 10, and are provided as the pockets or gaps between the trailing edge 33 of the visor 10 and the roof 14 of the truck 12. When the tensional inducer 35 is provided, two air relief vents 40, 42 are formed. In contrast, if the there is no tensional inducer, then there may be one elongated air relief vent along the trailing edge of the visor. As would be apparent to one skilled in the art, the depth of the air relief vents should be sufficient to provide desired stress relief on the visor.

Recessed lights 44 can be provided in the top panel 24. It should be appreciated that the recessed lights are optional and can be excluded, if desired. It is generally understood that the recessed lights 44 provide a more pleasing look to the visor 10, and can provide additional illumination. The power cord 46 can be provided to power the recessed lights 44 from the vehicle.

Now referring to the mounting regions 20, 22. These regions are provided for attaching the visor 10 to the truck 12. The brackets or mounting plates 50, 52 are provided for mounting the visor 10 to the door frame of the truck 12. The brackets 50, 52 include ears 54, 56, respectively, which are secured to both the top and bottom panels 24, 26 at the wing tips 21, 23. Preferably, the ears 54, 56 are adhered to both the top and bottom panels 24, 26 by adhesive.

In a preferred embodiment, the top and bottom panels and the brackets are prepared for a particular model motor vehicle. The brackets, for example, can be formed by stamping 0.7 to 0.8 inch thick sheet metal. Thus, once the parts are formed, they are assembled and fastened together so that the ears 54, 56 fit within the tube-like structure. Preferably, the ears 54, 56 are bonded, by adhesive, to both the top and bottom panels 24, 26. In an alternative embodiment, the brackets 50, 52 can be provided as an integral piece with the top panel 24 and/or the bottom panel 26. By this, it is meant that the brackets and the top and/or bottom panel can be formed from one piece of metal, plastic, fiberglass, ceramic, and the like.

The brackets 50, 52 include fastening rails 58, 60 which fit into the driver and passenger side door frames, respectively, of the truck 12 and attach thereto. Advantageously, the fastening rails can be designed to provide an exact fit for a particular model motor vehicle. Thus, the fastening rails can be moved along the door frame until it fits a particular predetermined location there along. Using the fastening rails as guides, the proper holes can be drilled, then the visor can be securely and accurately attached to the motor vehicle.

Figure 8:
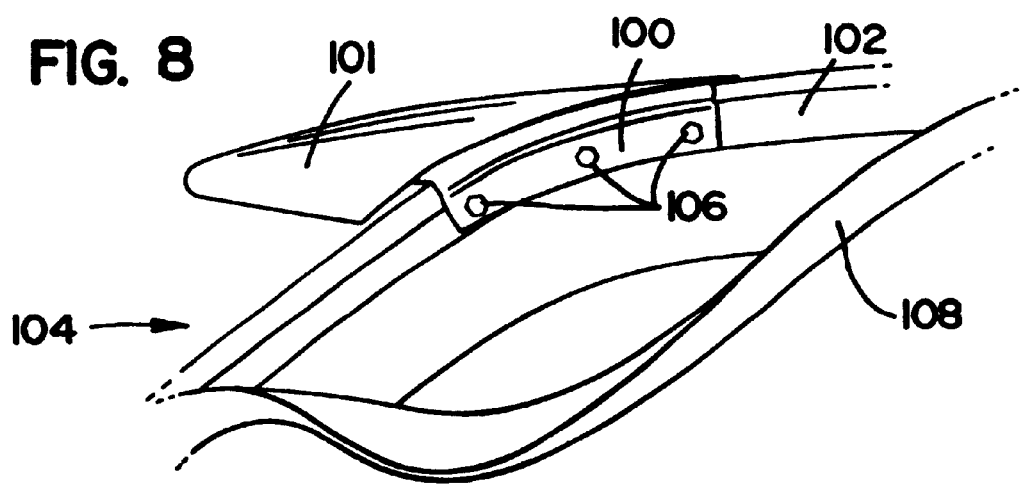
FIG. 8 is a side view of a windshield visor according to the principles of the present invention demonstrating the mounting thereof to a motor vehicle.

As shown in FIG. 8, the fastening rail 100 of the visor 101 can be provided with a predetermined design which will fit at only one location along the door frame 102 of the motor vehicle 104. Once appropriate holes are drilled, self threading or self tapping screws 106 having low profile heads are preferably used to fasten the fastening rail 100 to the door frame 102. The gasket 108, which was previously pulled away, can then be returned to its location along the door frame 102. In certain model trucks, it is understood that the fastening rail can be provided with an additional hole for securing the gasket thereto upon completion of attaching the visor to the truck. Thus, the speed at which the visor can be assembled onto the motor vehicle is significantly reduced by the present invention.

Figure 9:
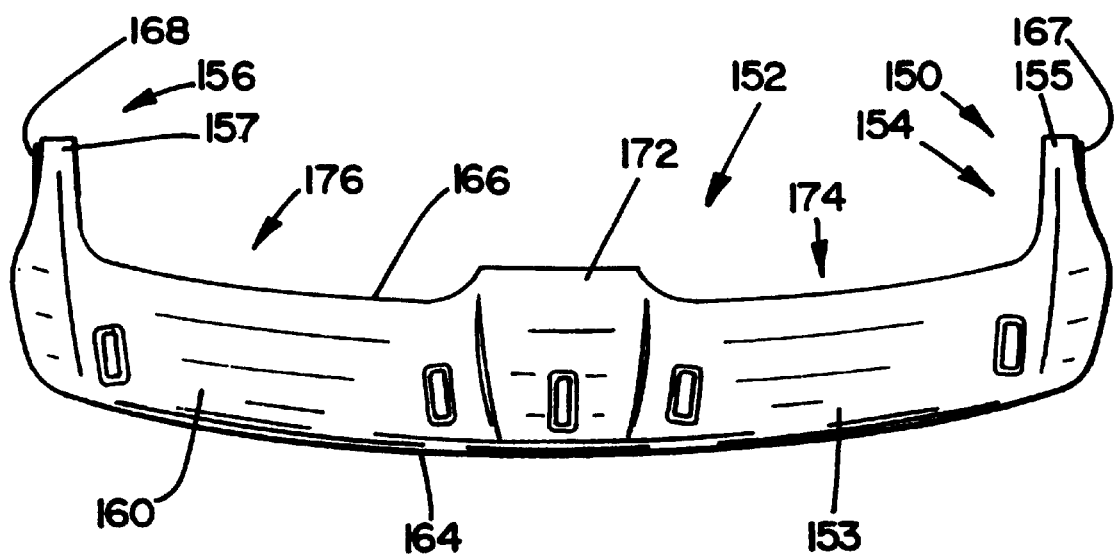
FIG. 9 is a top plan view of an alternative embodiment of the windshield visor according to the principles of the present invention.
Figure 10:
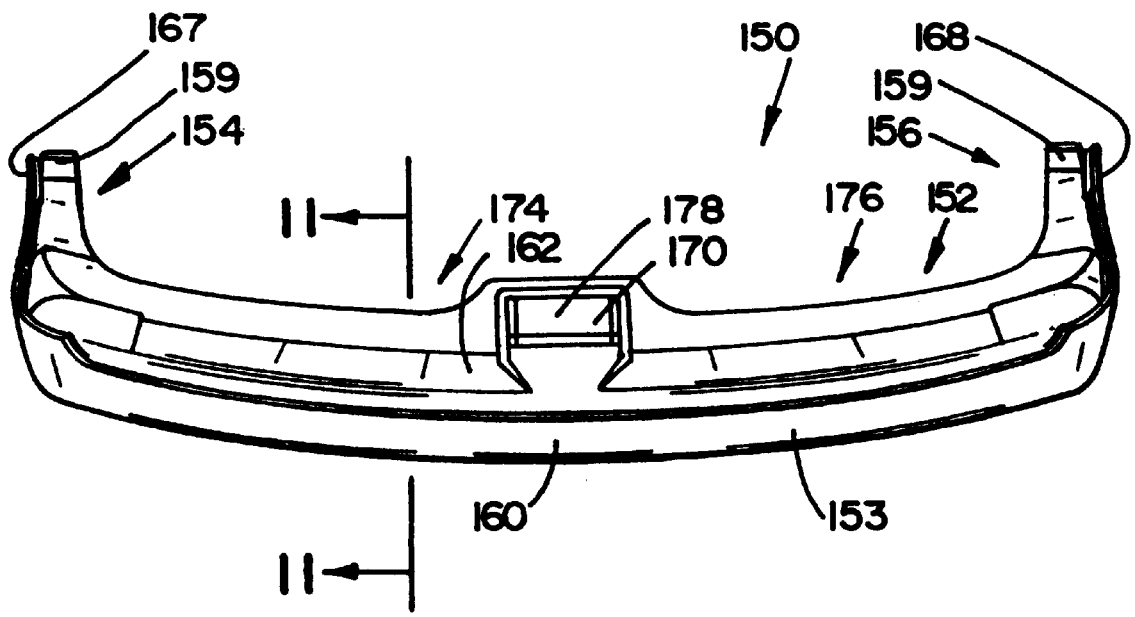
FIG. 10 is a bottom plan view of the windshield visor of FIG. 9.
Figure 11:
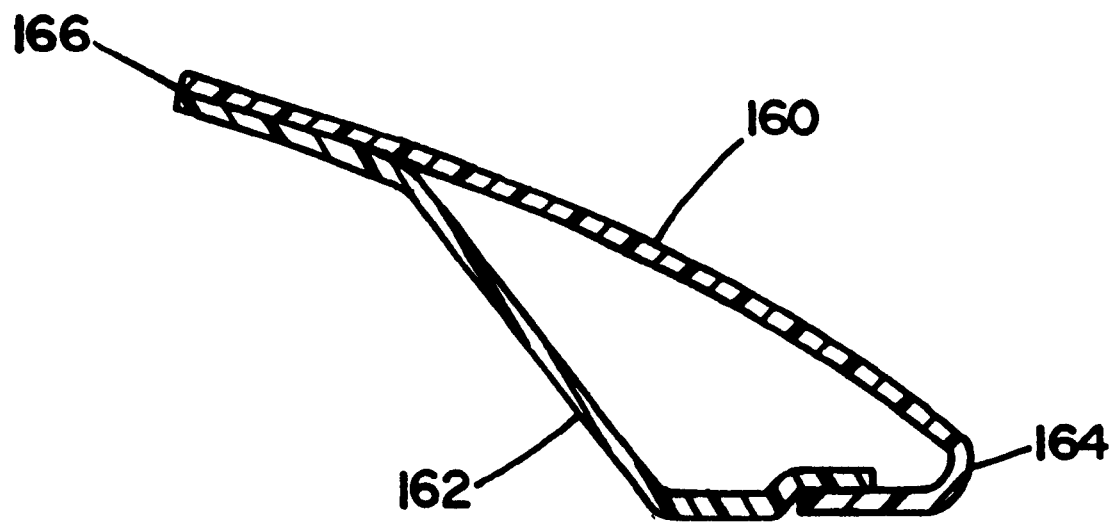
FIG. 11 is a vertical, partial sectional view of the windshield visor of FIG. 11 taken along line 11—11.

Now referring to FIGS. 9–11, an alternative preferred embodiment of the windshield visor in accordance with the present invention is depicted at reference numeral 150. It should be appreciated that the structure of the windshield visor 150 is generally similar to the structure of the windshield visor 10 described above. There are important features, however, which are different and these features are readily apparent from the following description and from observation of the figures.

The windshield visor 150 includes shading and shielding region 152 and mounting regions 154, 156. The shading and shielding region 152 includes a forward wing 153, and wing tips 155, 157. Preferably, the underneath side of the wing tips includes double sided tape pads 159 which holes the wing tips against the vehicle's roof.

The shading and shielding region 152 is preferably constructed of a top panel 160 and a bottom panel 162. The top panel 160 is provided with a shell configuration for receiving the bottom panel 162. The panels are fastened together in a similar manner as described above. The structure formed by the top and bottom panels 160, 162 can be referred to as a closed structure having a leading edge 164 and a trailing edge 166. The mounting regions 154, 156 include brackets 167, 168 which are used for fastening the visor 150 to the vehicle's door frames.

The windshield visor 150 includes a much larger tensional inducer 170 than the one described above. As a result of the larger tensional inducer 170, a tail 172 was provided by cutting the trailing edge 166 back further, thus providing air relief vents 174, 176. It has been found that the larger tensional inducer 170 is preferred because it allows for the use of a larger foam double sided adhesive tape 178 which keeps the center region of the visor from lifting off the vehicle when traveling at high speeds.

As is readily apparent from the description of the invention, another advantage of the present invention is the relative ease in placing the visor on the motor vehicle. In fact, the fastening rails can be designed so that improper installation of the visor is greatly reduced. Furthermore, it is particular advantage of the present invention that a visor can be attached and later detached without putting holes in the roof of a motor vehicle or in another highly visible location. Rather, the holes are in the door frame and can be easily repaired or filled in without significantly detracting from the overall appearance of the motor vehicle. Furthermore, since the visor can be attached to the door frame, it is easy to lock the visor onto the motor vehicle by simply locking the doors of the vehicle.

What is claimed:

1. A windshield visor for motor vehicles having windshield, roof, and driver and passenger side door frames, said visor comprising:

a forward wing for providing shading from sunlight and shielding from precipitation, the forward wing having first and second mounting regions, top and bottom surfaces, and leading and trailing edges;

a first bracket connected to the first mounting region of said forward wing, the first bracket being constructed and arranged to attach to a motor vehicle's driver side door frame;

a second bracket connected to the second mounting region of said forward wing, the second bracket being constricted and arranged to attach to a motor vehicle's passenger side door frame; and adhesive for adhesively attaching said forward wing to a motor vehicle's roof at a location provided between the first and second mounting regions.

2. A motor vehicle comprising:

windshield;

driver and passenger side door frames; and visor, the visor comprising:

a forward wing for providing shading from sunlight and shielding from precipitation, the forward wing having first and second mounting regions, top and bottom surfaces, and leading and trailing edges;

a first bracket connected to the first mounting region of said forward wing, the first bracket being constructed and arranged to attach to a motor vehicle's driver side door frame;

a second bracket connected to the second mounting region of said forward wing, the second bracket being constructed and arranged to attach to a motor vehicle's passenger side door frame; and adhesive for adhesively attaching said forward wing to a motor vehicle's roof at a location provided between the first and second mounting regions.

* * * * *